United States Patent
Rhea et al.

(10) Patent No.: US 11,216,573 B1
(45) Date of Patent: Jan. 4, 2022

(54) PRIVACY PRESERVATION IN PRIVATE CONSENSUS NETWORKS

(71) Applicant: United Services Automobile Association (USAA), San Antonio, TX (US)

(72) Inventors: Jonathan Huntington Rhea, North Richland Hills, TX (US); Bharat Prasad, San Antonio, TX (US); Minya Liang, Redmond, WA (US); Joseph Gregory Delong, San Antonio, TX (US); Steven J. Schroeder, Oak Point, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 199 days.

(21) Appl. No.: 16/533,140

(22) Filed: Aug. 6, 2019

Related U.S. Application Data (60) Provisional application No. 62/714,902, filed on Aug. 6, 2018.

(51) Int. Cl.
*G06F 21/62* (2013.01)
*H04L 9/06* (2006.01)
*H04L 9/32* (2006.01)

(52) U.S. Cl.
CPC ........ *G06F 21/6218* (2013.01); *H04L 9/0643* (2013.01); *H04L 9/3239* (2013.01); *H04L 2209/38* (2013.01)

(58) Field of Classification Search
CPC . H04L 9/0643; H04L 9/3239; H04L 2209/38; G06F 21/6218
USPC ........................................................ 713/164
See application file for complete search history.

(56) References Cited

U.S. PATENT DOCUMENTS

| | | | | |
|---|---|---|---|---|
| 10,803,537 | B2 * | 10/2020 | Brown | G06Q 20/401 |
| 10,872,381 | B1 * | 12/2020 | Leise | G06F 16/183 |
| 2017/0301047 | A1 * | 10/2017 | Brown | G06Q 20/382 |
| 2017/0353309 | A1 * | 12/2017 | Gray | G06F 21/51 |
| 2018/0130034 | A1 | 5/2018 | Taylor et al. | |
| 2018/0130050 | A1 | 5/2018 | Taylor et al. | |
| 2019/0188706 | A1 * | 6/2019 | McCurtis | G06Q 20/02 |
| 2019/0253240 | A1 * | 8/2019 | Treat | H04L 9/0637 |
| 2019/0286838 | A1 * | 9/2019 | Wang | G06F 21/54 |
| 2019/0324958 | A1 * | 10/2019 | Ow | G06F 16/2365 |
| 2020/0034926 | A1 * | 1/2020 | Busch | G06N 20/00 |
| 2020/0118096 | A1 * | 4/2020 | Yang | H04L 9/3247 |

(Continued)

OTHER PUBLICATIONS

ShenTu et al., "Transaction Remote Release (TRR): A New Anonymization Technology for Bitcoin," ATR Defense Science & Technology lab, 2015, 1-18.

*Primary Examiner* — Dant B Shaifer Harriman
(74) *Attorney, Agent, or Firm* — Fish & Richardson P.C.

(57) ABSTRACT

Implementations of the present disclosure include receiving a record corresponding to a private transaction recorded in two or more private state databases of entities participating in the private transaction within a distributed ledger system (DLS), generating a data representation based on the record, transmitting the data representation for public consensus processing within the DLS, and recording within a public ledger of the DLS, and providing a public record for recording in the DLS, the public record being recorded in a public state database of each of entity participating in the DLS.

18 Claims, 5 Drawing Sheets

(56) References Cited

U.S. PATENT DOCUMENTS

| | | | |
|---|---|---|---|
| 2020/0304288 A1* | 9/2020 | Schwartz | H04L 63/101 |
| 2020/0320490 A1* | 10/2020 | Yeap | G06Q 20/3827 |
| 2020/0349532 A1* | 11/2020 | Brown | H04L 9/3247 |
| 2020/0410491 A1 | 12/2020 | Ronnow et al. | |
| 2021/0083845 A1* | 3/2021 | Sen | H04L 9/3297 |
| 2021/0203476 A1 | 7/2021 | van de Ruit et al. | |

\* cited by examiner

PRIVACY PRESERVATION IN PRIVATE CONSENSUS NETWORKS

CROSS REFERENCE TO RELATED APPLICATION

This application is a non-provisional of and claims priority to U.S. Provisional Patent Application No. 62/714,902, filed on Aug. 6, 2018, the entire contents of which is hereby incorporated by reference.

BACKGROUND

Distributed ledger systems (DLSs), which can also be referred to as consensus networks, and/or blockchain networks, enable participating entities to securely, and immutably store data. Example types of DLSs can include public DLSs, and private DLSs. A public DLS is open for all entities to use the DLS, and participate in the consensus process. A private DLS is provided for a particular entity, which centrally controls read and write permissions.

Another type of DLS includes a consortium DLS. A consortium DLS is provided for a select group of entities, which control the consensus process, and includes an access control layer. Consequently, one or more entities participating in the consortium DLS have control over who can access the consortium DLS, and who can participate in the consensus process of the consortium DLS. For example, a group of institutions (e.g., financial institutions) can participate in a consortium DLS to immutably record transactions. In some examples, an entity can be able to access/view data within the consortium DLS, but not contribute data to the consortium DLS.

SUMMARY

Implementations of the present disclosure include computer-implemented methods for privacy preservation in private consensus networks. More particularly, implementations of the present disclosure are directed to providing a data representation of a private transaction as a public transaction for recording in a global blockchain of a distributed ledger system (DLS), and using the public transaction to identify an accurate (or inaccurate) record of the private transaction within private state databases of respective entities.

In some implementations, actions include receiving a record corresponding to a private transaction recorded in two or more private state databases of entities participating in the private transaction within a DLS, generating a data representation based on the record, transmitting the data representation for public consensus processing within the DLS, and recording within a public ledger of the DLS, and providing a public record for recording in the DLS, the public record being recorded in a public state database of each of entity participating in the DLS. Other implementations include corresponding systems, apparatus, and computer programs, configured to perform the actions of the methods, encoded on computer storage devices.

These and other implementations may each optionally include one or more of the following features: actions further include receiving a first record from a first entity that participated in the private transaction, and a second record from a second entity that participated in the private transaction, processing the first record, and the second record in view of the public record based on a proof, and determining that one or more of the first record, and the second record is inaccurate relative to the public record based on the proof; the proof includes a Merkle tree proof (MTP); the record results from private consensus processing of private transaction data performed by entities participating in the private transaction; the public record results from public consensus processing of the data representation performed by entities participating in the DLS; the data representation includes a hash value that is calculated based on the record; and the DLS is a consortium DLS.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The subject matter described in this specification can be implemented in particular embodiments so as to realize one or more of the following advantages. The techniques described in this specification allows a system to validate private transactions between two or more entities (i) more accurately than prior systems by using a consensus protocol, and (ii) more privately and securely than prior systems because it does not expose private information related to the private transactions to a global blockchain network. In particular, while it is challenging for prior systems to achieve consensus between a small number of participants (e.g., two or more participants), systems that employ the techniques described herein can provide a data representation of a private transaction as a public transaction for recording in a global blockchain of a DLS, thereby allowing the global blockchain to be used to identify an accurate (or inaccurate) record of the private transaction between two or more entities within private state databases of respective entities by using a consensus protocol. At the same time, the systems can securely maintain the privacy of private transactions by not exposing private information to auditor nodes in the global blockchain of the DLS.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for privacy preservation in private consensus networks. More particularly, implementations of the present disclosure are directed to providing a data representation of a private transaction as a public transaction for recording in a global blockchain of a distributed ledger system (DLS), and using the public transaction to identify an accurate (or inaccurate) record of the private transaction within private state databases of respective entities. In some implementations, actions include receiving a record corresponding to a private transaction recorded in two or more private state databases of entities participating in the private transaction within a DLS, generating a data representation based on the record, transmitting the data representation for public consensus processing within the DLS, and recording within a public ledger of the DLS, and providing a public record for recording in the DLS, the public record being recorded in a public state database of each of entity participating in the DLS.

To provide further context for implementations of the present disclosure, and as introduced above, DLSs, which can also be referred to as consensus networks (e.g., made up of peer-to-peer nodes), and blockchain networks, enable participating entities to securely, and immutably store data. A DLS can be provided as a public DLS, a private DLS, or a consortium DLS. Implementations of the present disclosure are described in further detail herein with reference to a consortium DLS, which is private among the participating entities. It is contemplated, however, that implementations of the present disclosure can be realized in any appropriate type of DLS.

In a consortium DLS, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium DLS, each of which operates at least one node in the consortium DLS. Accordingly, the consortium DLS can be considered a private network with respect to the participating entities. In some examples, each entity (node) must sign every block in order for the block to be valid, and added to the DLS. In some examples, at least a sub-set of entities (nodes) (e.g., at least 7 entities) must sign every block in order for the block to be valid, and added to the DLS. An example consortium DLS includes Quorum, developed by J.P. Morgan Chase & Co. of New York, N.Y. Quorum can be described as an enterprise-focused, permissioned DLS (blockchain) infrastructure specifically designed for financial use cases. Quorum is built off of Go Ethereum, the base code for the Ethereum blockchain, which is provided by the Ethereum Foundation of Zug, Switzerland.

Figure 1:
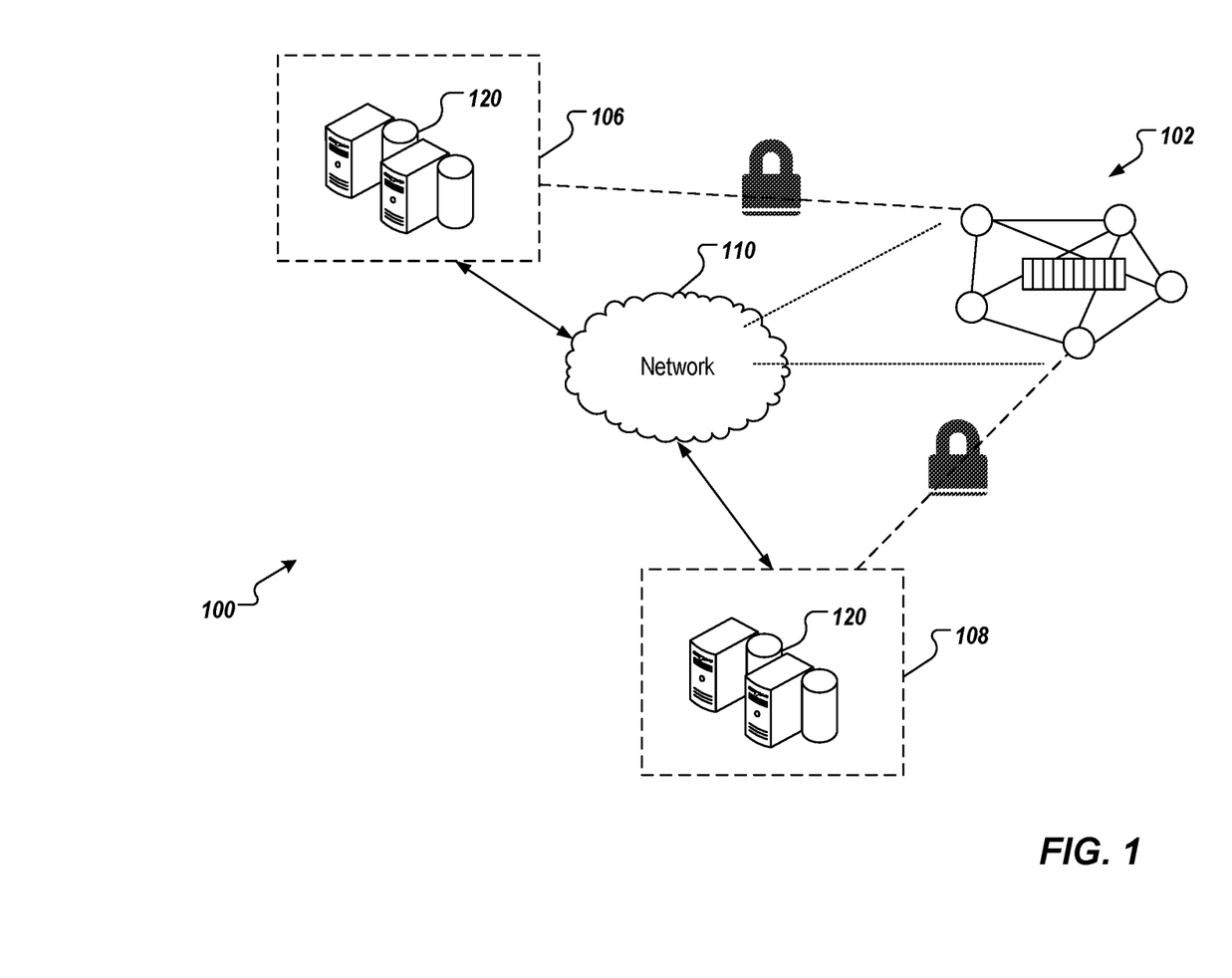
FIG. 1 depicts an example environment that can be used to execute implementations of the present disclosure.

FIG. 1 depicts an example environment 100 that can be used to execute implementations of the present disclosure. In some examples, the example environment 100 enables entities to participate in a consortium DLS 102. The example environment 100 includes back-end systems 106, 108, and a network 110. In some examples, the network 110 includes a local area network (LAN), wide area network (WAN), the Internet, or a combination thereof, and connects web sites, user devices (e.g., computing devices), and back-end systems (e.g., the back-end systems 106, 108). In some examples, the network 110 can be accessed over a wired and/or a wireless communications link.

In the depicted example, the back-end systems 106, 108 each include at least one server system 120. In some examples, the at least one server system 120 hosts one or more computer-implemented services for interacting with the consortium DLS 102. For example, the back-end system 106 can host computer-implemented services of a first entity (e.g., financial institution), such as transaction management system that the first entity uses to manage its transactions with one or more other entities (e.g., financial transactions). The back-end system 108 can host computer-implemented services of a second entity (e.g., financial institution), such as transaction management system that the second entity uses to manage its transactions with one or more other entities (e.g., financial transactions). In the example of FIG. 1, the consortium DLS 102 is represented as a peer-to-peer network of nodes, and the back-end systems 106, 108 provide nodes of the first entity, and second entity respectively, which participate in the consortium DLS 102.

Figure 2:
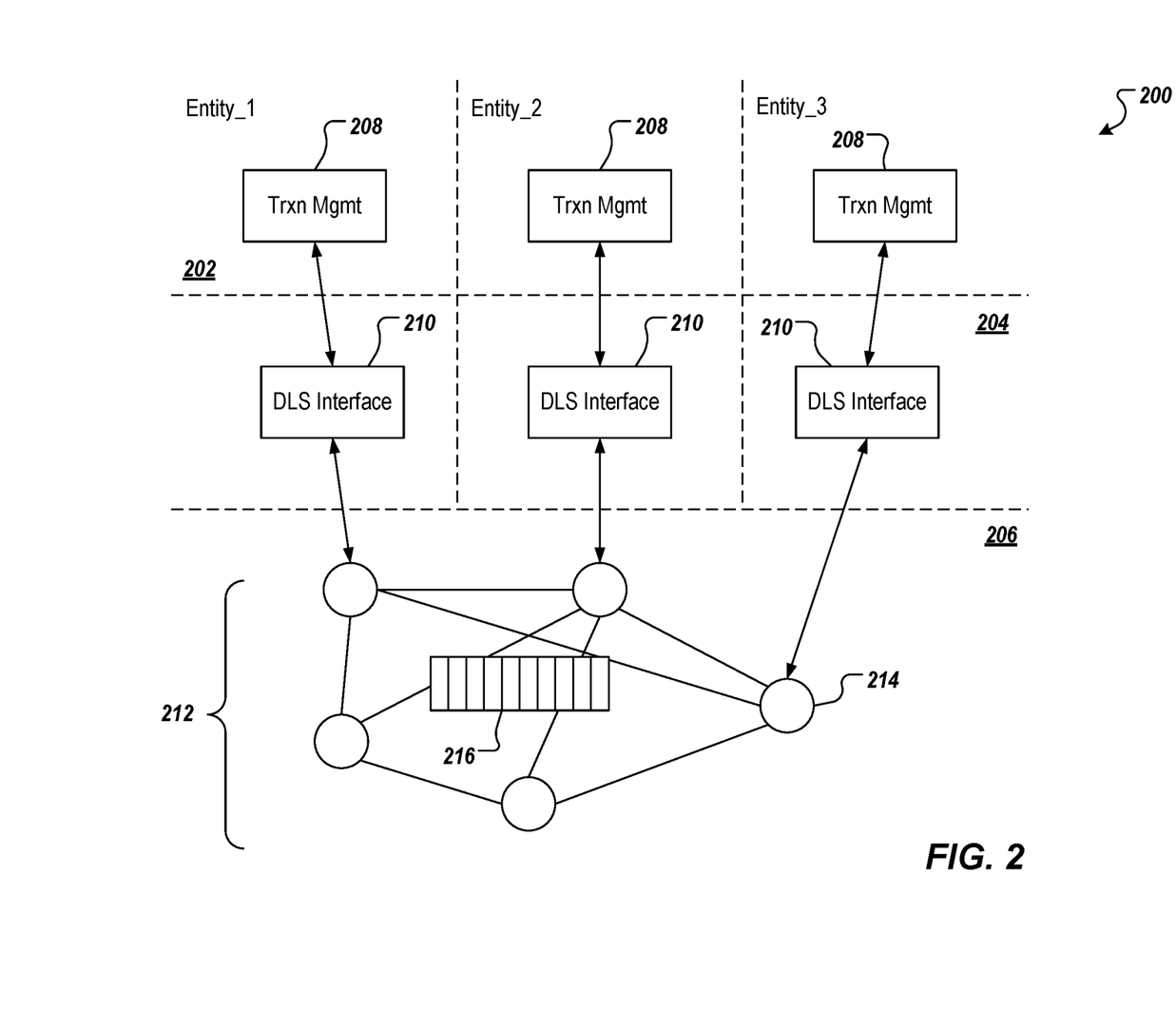
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a consortium DLS layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes DLS interfaces 210 for each transaction management system 210. In some examples, a respective transaction management system 208 communicates with a respective DLS interface 210 over a network (e.g., the network 110 of FIG. 1) using a protocol (e.g., hypertext transfer protocol secure (HTTPS)). In some examples, each DLS interface 210 provides communication connection between a respective transaction management system 208, and the DLS layer 206. More particularly, the DLS interface 210 communicate with a DLS 212 of the DLS layer 206. In some examples, communication between a DLS interface 210, and the DLS layer 206 is conducted using remote procedure calls (RPCs). In some examples, the DLS interfaces 210 "host" DLS nodes for the respective transaction management systems 208. For example, the DLS interfaces 210 provide the API for access to DLS 212.

As described herein, the DLS 212 is provided as a peer-to-peer network including a plurality of nodes 214 that immutably record information in a blockchain 216. Although a single blockchain 216 is schematically depicted, multiple copies of the blockchain 216 are provided, and are maintained across the DLS 212. For example, each node 214 stores a copy of the blockchain. In some implementations, the blockchain 216 stores information associated with transactions that are performed between two or more entities participating in the consortium DLS.

In general, a consortium DLS supports multiple classes of transactions. Example classes of transactions include, without limitation, public transactions, and private transactions. A public transaction is shared with all the nodes within the consortium DLS, and are stored in a global blockchain. A global blockchain is a blockchain that is replicated across all nodes. That is, all nodes are in perfect state consensus with respect to the global blockchain. A private transaction is shared only with the transaction participants (e.g., multiple, but less than all of the entities participating in the consortium DLS). In some consortium DLSs, such as Quorum, multiple, private blockchains are maintained to record the private transactions. That is, for each node, a private blockchain is maintained for private transactions the respective entity participated in. Consequently, the state database (blockchain) is segmented, being split into a private state database, and a public state database. All nodes in the consortium DLS are in state consensus with respect to the public state database (global blockchain), but not with respect to the private state databases (private blockchains).

To achieve consensus (e.g., agreement to the addition of a block to a blockchain), a consensus protocol is implemented within the consortium DLS. An example consensus protocol includes Raft, which is a consensus algorithm that implements a leader approach. Applying Raft to a consortium DLS (cluster of nodes), one and only one elected leader (node) is responsible for managing log replication on the other nodes of the cluster. A leader leads until it fails or disconnects, in which case a new leader is elected. However, a limitation of Raft is the inability to achieve Byzantine Fault Tolerance (BFT) consensus with less than three (3) participants in the presence of a faulty node. BFT consensus generally refers to the ability for consensus to be achieved even in the presence of one or more faulty nodes. In this scenario, the consensus can tolerate, at most, F faulty nodes in a network having N validator nodes, where $N=2F+1$.

Another example consensus protocol includes Practical BFT (PBFT), which functions in asynchronous environments, such as a consortium DLS. However, a limitation of PBFT is the inability to achieve BFT consensus with less than four (4) participants in the presence of a faulty node. In this scenario, the consensus can tolerate, at most, F faulty nodes in a network having N validator nodes, where $N=3F+1$.

When considering private transactions in a consortium DLS, less than all nodes participate in the consensus protocol. In some instances, less than three or four nodes might participate. For example, in Quorum, two entities might participate in a private transaction, and each add a block to their respective private blockchains. In such instances, BFT consensus cannot be achieved, because of too small a number of validator nodes (e.g., nodes of respective entities participating in the private transaction).

An example option to mitigate this can include increasing the number of validator nodes in a private transaction. For example, an auditor node could be added to any two-party private transaction for Raft consensus to achieve at least three validator nodes. As another example, one or more auditor nodes could be added to any private transaction having less than four validator nodes for PBFT consensus. However, this reduces the privacy of the private transaction by exposing at least some information to the auditor node(s). Further, this adds to the overall complexity of the consortium DLS. Another example option to mitigate this is to discontinue the availability of recording private transactions within the consortium DLS. This, however, may make the consortium DLS impractical, and unattractive for entities to participate in.

In view of this, implementations of the present disclosure provide at least one public transaction corresponding to each private transaction recorded on a private channel. In some implementations, a data representation of a private transaction is provided as a public transaction for recording in a global blockchain of a DLS, which can be used to identify an accurate (or inaccurate) record of the private transaction within private state databases of respective entities.

In further detail, a private transaction is conducted between two or more entities. For example, a first entity (E1) and a second entity (E2) can conduct a private transaction (e.g., subrogation payment) that is to be recorded in the consortium DLS. In some examples, the private transaction is processed through a (private) consensus process (e.g., Raft, PBFT) by the entities participating in the private transaction (e.g., E1, and E2), to provide private state data that is recorded in private state databases of the participating entities. That is, the private state data corresponding to the private transaction is recorded in the respective private state databases of the participating entities, but is not directly recorded in any other state databases (e.g., private state databases of non-participating entities, global state database (global blockchain) replicated across all entities).

In accordance with implementations of the present disclosure, a data representation of the private state data is provided. In some examples, the data representation includes a hash value that is provided by processing the private state data through a hash function. Example hash functions can include, but are not limited to, Keccak-256, and SHA3-256. Each of the hash functions are provided as one-way hash functions in that the input to the hash function cannot be deduced from the output of the hash function. In some examples, the seed value used for the hash function is a publicly known seed value (e.g., known to all entities participating in the consortium DLS).

In some implementations, the data representation is sent as a public transaction for public consensus processing. For example, and as described above with reference to the consortium DLS, each entity (node) participates in the consensus processing (e.g., Raft, PBFT) to add the data representation to the public state database (global blockchain). As another example, and as also described above with reference to the consortium DLS, at least a sub-set of entities (nodes) (e.g., at least 7 entities) participates in the consensus processing (e.g., Raft, PBFT) to add the data representation to the public state database (global blockchain).

In some implementations, a transaction, provision of a data representation for the transaction, and transmitting of the data representation can be at least partially performed based on a smart contract. In some examples, the smart contract is executed within the consortium DLS, and performs functionality for entities participating in a respective private transaction. A smart contract can be described as computer-executable code that performs one or more functions corresponding to an agreement between entities. For example, multiple entities intending to conduct private transactions within the consortium DLS can institute a smart contract to facilitate private transactions, and, in accordance with implementations of the present disclosure, provide data representations of the private transactions, and transmit the data representations for public consensus processing to the DLS.

In some implementations, discrepancies (disagreements) can occur between entities that participated in one or more private transactions. For example, entities can disagree as to one or more features (e.g., date, time, amount, receiving account, debited account) of a transaction. As another example, entities can disagree as to one or more features of multiple transactions (e.g., an aggregate amount of a set of transactions).

In response to a discrepancy, and in accordance with implementations of the present disclosure, records of respective, disagreeing entities can be compared to a record of the global blockchain to determine which entity is correct. For example, and as described in further detail herein, a proof can be performed by, or on behalf of each entity to determine which entity is asserting an accurate record. That is, the proof proves that a particular entity has the data (record) that had been used for the corresponding global blockchain record.

In some examples, the proof is provided as a so-called Merkle proof, or Merkle tree proof (MTP), which is based on a hash tree (Merkle tree). A hash tree can be described as a tree data structure, in which every leaf node is labelled with the hash of a data block, and every non-leaf node is labelled with a cryptographic hash of the labels of its child nodes. In some examples, the Merkle proof is executed for resource-efficient, and secure verification of the contents of data structures. The Merkle proof is deemed to be secure, in that the presence of the actual data can be determined without revealing the data itself.

Figure 3A:
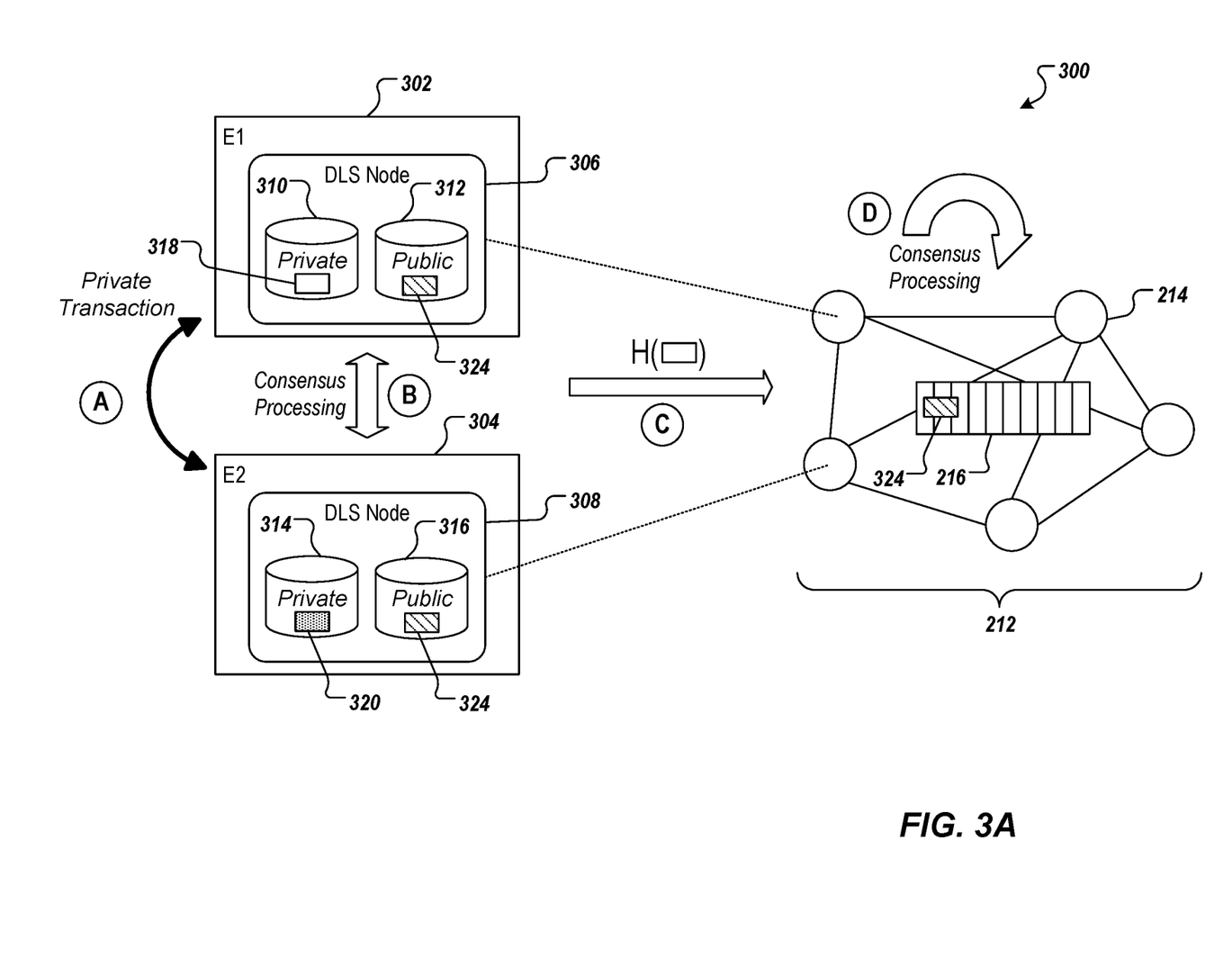
FIGS. 3A and 3B depict an example workflow in accordance with implementations of the present disclosure.
Figure 3B:
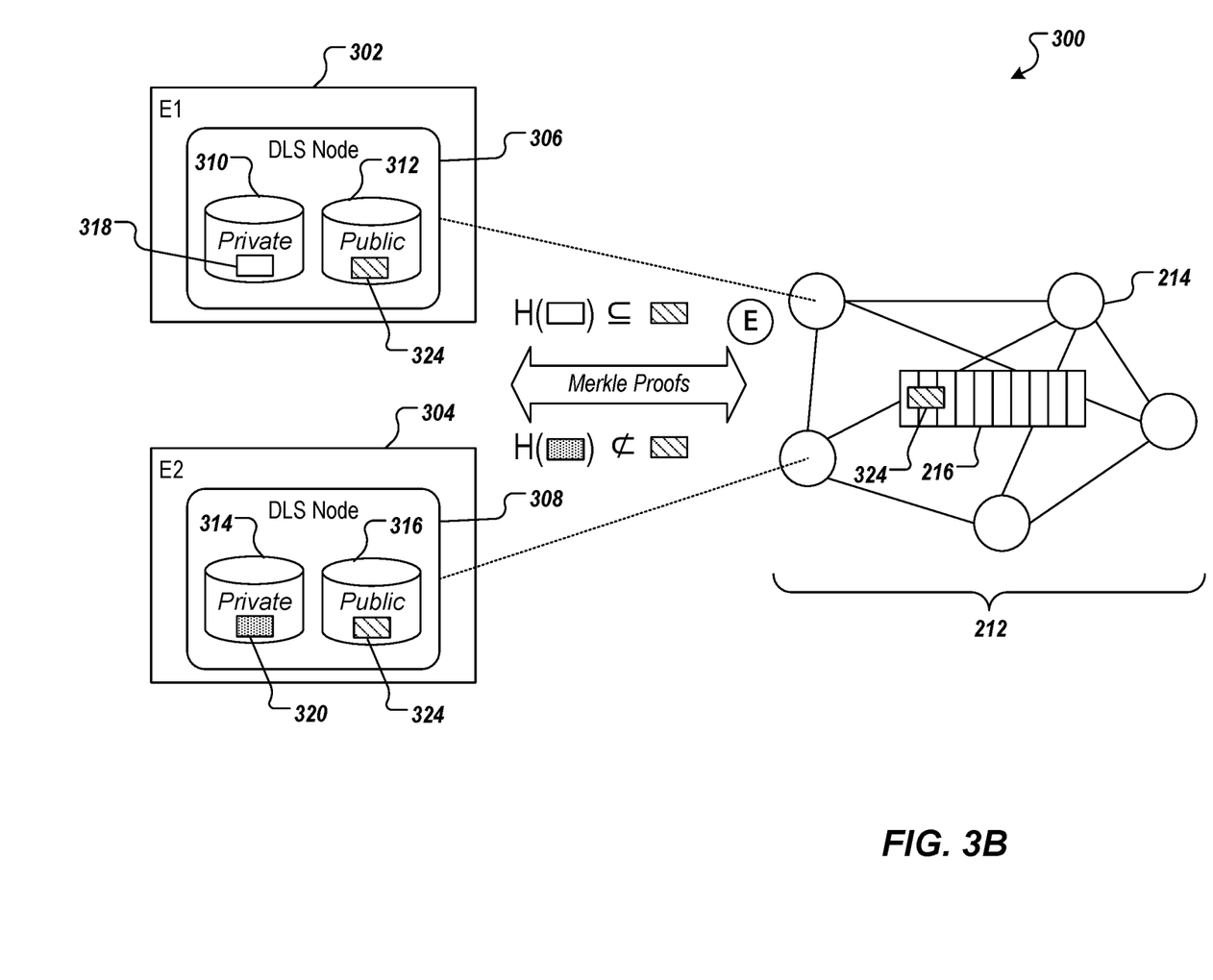

FIGS. 3A and 3B depict an example workflow 300 in accordance with implementations of the present disclosure. The example workflow 300 is based on a private transaction (e.g., subrogation payment) between a first entity (E1) 302, and a second entity (E2) 304. In some examples, the first entity 302, and the second entity 304 are represented by one or more backend systems (e.g., the back-end systems 106, 108 of FIG. 1) that are operated by, or on behalf of the first entity 302, and the second entity 304, respectively. More particularly, the first entity 302, and the second entity 304 are associated with respective nodes 306, 308 of a DLS, depicted as the DLS 212 of FIG. 2. In some examples, the DLS 212 is provided as a consortium DLS.

In some implementations, the first entity 302 maintains a private state database 310, and a public state database 312, and the second entity 304 maintains a private state database 314, and a public state database 316. In some examples, the private state database 310 records private transactions between the first entity 302, and one or more other entities participating in the DLS 212 (e.g., the second entity 304). In some examples, the private state database 314 records private transactions between the second entity 304, and one or more other entities participating in the DLS 212 (e.g., the first entity 302). In some examples, each entity participating in the DLS 212 can maintain a respective private state database, which can, in some instances, be out of state consensus with one or more private state databases of other entities participating in the DLS 212 (imperfect state consensus).

In some examples, the public state databases 312, 316 record public transactions between entities participating in the DLS 212. For example, each public transaction is processed through a consensus algorithm (e.g., Raft, PBFT) for recording in a global blockchain (e.g., the blockchain 216), which is replicated across all entities participating in the DLS 212. Accordingly, the global blockchain, and thus, the public state databases of all entities (e.g., the public state databases 312, 316) are in perfect state consensus.

As depicted in FIG. 3A, a private transaction (A) can occur between the first entity 302, and the second entity 304. By way of non-limiting example, the first entity 302 can make a subrogation payment to the second entity 304. In some examples, transaction data is provided (e.g., date, time, amount, receiving account, debited account). In some examples, consensus processing (B) is performed on at least a portion of data representative of the private transaction. For example, an identifier can be assigned to the private transaction, the private transaction can be processed between the first entity 302, and the second entity 304, and respective records 318, 320 are provided in the private state database 310, and the private state database 314.

In general, the records 318, 320 should be identical. However, and as described above, BFT cannot be achieved with too few nodes (entities) participating in the consensus processing. In the example of FIGS. 3A and 3B, BFT cannot be achieved for recording the private transaction in the private state databases 310, 314, because only two entities, the first entity 302, and the second entity 304, participate in the consensus processing for the private transaction. Consequently, and as depicted by way of shading in FIG. 3A, the records 318, 320 are different. In the depicted example, the record 318 corresponds to an accurate record, while the record 320 corresponds to an inaccurate record.

In some implementations, the result of the consensus processing of the private transaction is an accurate record that is to be recorded in each of the private state databases 310, 314. However, during recording, or after recording, the accurate record may be altered within one or more private state databases (e.g., due to unintentional error, or intentional manipulation), and lead to an inaccurate record being recorded.

In accordance with implementations of the present disclosure, a data representation (C) is provided from the result (accurate record) of the consensus processing of the private transaction. In the example of FIG. 3A, the data representation is provided as a hash of the result (e.g., a hash of the accurate record), and is provided to the DLS 212 for consensus processing (D) as a public transaction. That is, the data representation is treated as a public transaction that is to be recorded in the global blockchain (e.g., the blockchain 216, as replicated across all entities in respective public state databases). In some examples, in response to occurrence of the private transaction, a smart contract can receive the result (accurate record) of the consensus processing of the private transaction, and can automatically provide the data representation for recording to the global blockchain.

In some implementations, a public record 324 results from the public consensus processing, and is recorded in the blockchain 216. Consequently, the blockchain 216, and thus the public record 324 is replicated across the public state databases of all entities participating in the DLS 212 (e.g., the public state databases 312, 316 of the first entity 302, and the second entity 304, respectively).

In some implementations, a discrepancy can occur between entities participating in one or more private transactions. With reference to FIG. 3B, a discrepancy can occur between the first entity 302, and the second entity 304 as to the private transaction depicted in FIG. 3A. In some examples, the discrepancy can include a disagreement as to data associated with the private transaction (e.g., date, time, amount, receiving account, debited account). As depicted in FIGS. 3A and 3B, the discrepancy can be based on the record 318, and the record 320, the first entity 302 asserting the record 318 is accurate, and the second entity 304 asserting that the record 320 is accurate.

In some implementations, and in response to a discrepancy, Merkle proofs are performed to determine the accuracy of their respective records with reference to a corresponding record in the global blockchain. That is, and with reference to FIG. 3B, the Merkle proofs (E) are performed for each of the first entity 302, and the second entity 304. That is, a Merkle proof is performed for the first entity 302 based on the record 318, and the record 324, and a Merkle proof is performed for the second entity 304 based on the record 320, and the record 324. For example, the Merkle proofs can include determining whether hashes of the respective records 318, 320 are included within the global blockchain 216. If the hash of a record is included in the global blockchain 216, the record is determined to be accurate. In the example of FIG. 3B, it is determined that the record 318 is accurate, and that the record 320 is inaccurate. Consequently, the discrepancy is resolved in favor of the first entity 302, and the record 318 controls. In some examples, the record 320 can be replaced by the record 318 within the private state database 314 of the second entity 304.

In some implementations, one or more of the Merkle proofs are performed by a smart contract executed within the DLS 212. For example, in response to one or more entities triggering a discrepancy, the smart contract can receive records that are to be compared from the respective entities, or can receive hashes of the records that are to be compared from the respective entities. In some examples, the smart contract performs the Merkle proofs, and provides an output as to which record controls.

In some implementations, a record can correspond to a single private transaction, or multiple private transactions. For example, the records 318, 320 can correspond to a single private transaction between the first entity 302, and the second entity 304. As another example, the records 318, 320 can correspond to multiple private transactions between the first entity 302, and the second entity 304 (e.g., aggregate payments between the entities).

Figure 4A:
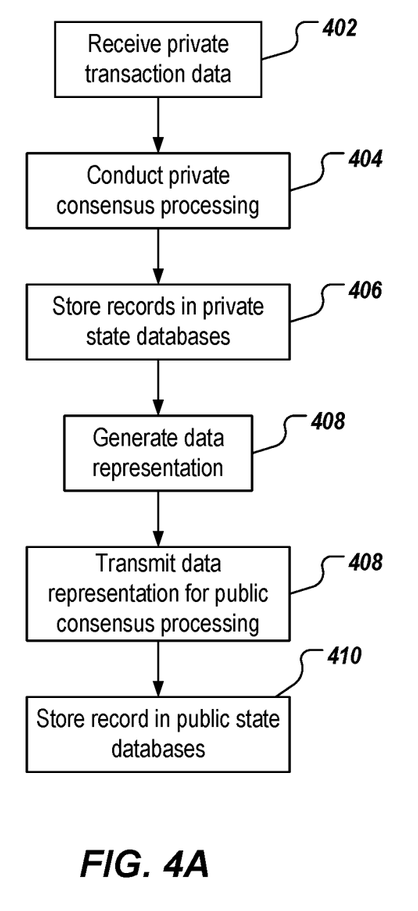
FIGS. 4A and 4B depict example processes that can be executed in accordance with implementations of the present disclosure.
Figure 4B:
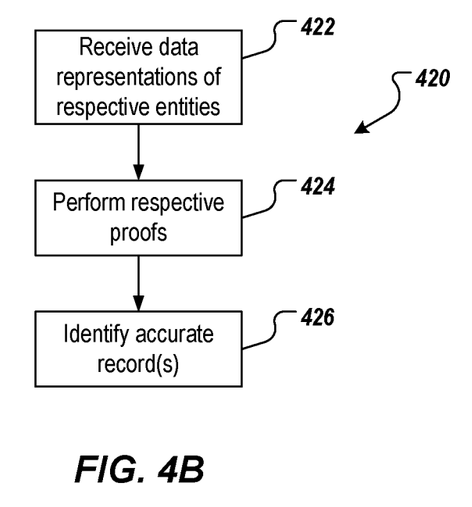

FIGS. 4A and 4B depict example processes 400, 420, respectively, that can be executed in accordance with implementations of the present disclosure. In some implementations, the example processes 400, 420 may be performed using one or more computer-executable programs executed using one or more computing devices. For example, the example process 400, 420 can be executed by one or more smart contracts within a consortium DLS. For example, the example process 400 can be executed by a first smart contract that facilitates private transactions between two or more entities. As another example, the example process 420 can be executed by a second smart contract that facilitates disagreement resolution between any entities participating in the DLS.

With reference to FIG. 4A, the example process 400 is performed as part of a private transaction that is executed between multiple entities. Private transaction data is received (402). For example, one or more features (e.g., date, time, amount, receiving account, debited account) of a private transaction that is executed between two or more entities within a consortium DLS are received. Private consensus processing is conducted (404). For example, the first smart contract, and/or the two or more entities conduct the private consensus processing (e.g., Raft, PBFT). Records are stored in private state databases (406). For example, the first smart contract, and/or the two or more entities store a record, which results from the private consensus processing, within respective private state databases of the two or more entities.

A data representation is generated (408). For example, a data representation is generated based on the record, which resulted from the private consensus processing. In some examples, the data representation is provided as a hash value of the record. The data representation is transmitted for public consensus processing (410). For example, at least one of the two or more entities transmit the data representation for public consensus processing. As described herein, entities participating in the consortium DLS conduct the public consensus processing, and include entities that are non-participants in the private transaction. Records are stored in the public state databases (412). For example, a record resulting from the public consensus processing is distributed to all nodes (entities) of the consortium DLS, and is stored in respective public state databases.

With reference to FIG. 4B, the example process 420 can be executed in response to a disagreement between entities that had participated in a private transaction. Data representations are received from respective entities (422). For example, for a disputed private transaction (or multiple private transactions), a data representation is received from each of the entities that had participated in the private transaction. For example, a corresponding record is retrieved from a private state database of an entity, and a data representation is generated (e.g., using the hash function). Respective proofs are performed (424). For example, MTPs are performed for each data representation provided from the respective entities. One or more accurate records are identified (426). For example, for each entity, the respective MTP reveals whether the data representation is included in the public state database (global blockchain). If a data representation is included in the public state database, the respective entity's record is determined to be accurate (and controlling). In some examples, multiple records can be determined to be accurate. For example, if three or more entities participated in a private transaction, the records of two entities can be determined to be accurate, while the record of the third entity is determined to be inaccurate.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by at least one processor, the method comprising:
   receiving, by the at least one processor, a record corresponding to a private transaction recorded in two or more private state databases of entities participating in the private transaction within a distributed ledger system (DLS), wherein the record comprises private state data obtained by processing the private transaction through a private consensus process;
   generating, by the at least one processor, a data representation of the private transaction based on the record, comprising:
      processing the private state data through a hash function to generate a hash value;
   providing, by the at least one processor, the data representation comprising the hash value as a public transaction for public consensus processing within the DLS, and recording within a public ledger of the DLS; and
   providing, by the at least one processor, a public record for recording in the DLS, the public record being recorded in a public state database of each entity participating in the DLS.

2. The method of claim 1, further comprising:
   receiving a first record from a first entity that participated in the private transaction and a second record from a second entity that participated in the private transaction;
   processing the first record and the second record in view of the public record based on a proof; and
   determining that one or more of the first record and the second record is inaccurate relative to the public record based on the proof.

3. The method of claim 2, wherein the proof comprises a Merkle tree proof (MTP).

4. The method of claim 1, wherein the private consensus process is performed by the entities participating in the private transaction.

5. The method of claim 1, wherein the public record results from public consensus processing of the data representation performed by entities participating in the DLS.

6. The method of claim 1, wherein the DLS is a consortium DLS.

7. A non-transitory computer-readable storage medium coupled to one or more processors and having instructions stored thereon which, when executed by the one or more processors, cause the one or more processors to perform operations comprising:
   receiving a record corresponding to a private transaction recorded in two or more private state databases of entities participating in the private transaction within a distributed ledger system (DLS), wherein the record comprises private state data obtained by processing the private transaction through a private consensus process;
   generating a data representation of the private transaction based on the record, comprising:
      processing the private state data through a hash function to generate a hash value;
   providing the data representation comprising the hash value as a public transaction for public consensus processing within the DLS, and recording within a public ledger of the DLS; and
   providing a public record for recording in the DLS, the public record being recorded in a public state database of each entity participating in the DLS.

8. The non-transitory computer-readable storage medium of claim 7, wherein the operations further comprise:
   receiving a first record from a first entity that participated in the private transaction and a second record from a second entity that participated in the private transaction;
   processing the first record and the second record in view of the public record based on a proof; and
   determining that one or more of the first record and the second record is inaccurate relative to the public record based on the proof.

9. The non-transitory computer-readable storage medium of claim 8, wherein the proof comprises a Merkle tree proof (MTP).

10. The non-transitory computer-readable storage medium of claim 7, wherein the private consensus process is performed by entities participating in the private transaction.

11. The non-transitory computer-readable storage medium of claim 7, wherein the public record results from public consensus processing of the data representation performed by entities participating in the DLS.

12. The non-transitory computer-readable storage medium of claim 7, wherein the DLS is a consortium DLS.

13. A system comprising:
a computing device; and
a computer-readable storage device coupled to the computing device and having instructions stored thereon which, when executed by the computing device, cause the computing device to perform operations comprising:
  receiving a record corresponding to a private transaction recorded in two or more private state databases of entities participating in the private transaction within a distributed ledger system (DLS), wherein the record comprises private state data obtained by processing the private transaction through a private consensus process;
  generating a data representation of the private transaction based on the record, comprising:
    processing the private state data through a hash function to generate a hash value;
  providing the data representation comprising the hash value as a public transaction for public consensus processing within the DLS, and recording within a public ledger of the DLS; and
  providing a public record for recording in the DLS, the public record being recorded in a public state database of each entity participating in the DLS.

14. The system of claim 13, wherein the operations further comprise:
  receiving a first record from a first entity that participated in the private transaction and a second record from a second entity that participated in the private transaction;
  processing the first record and the second record in view of the public record based on a proof; and
  determining that one or more of the first record and the second record is inaccurate relative to the public record based on the proof.

15. The system of claim 14, wherein the proof comprises a Merkle tree proof (MTP).

16. The system of claim 13, wherein the record results from private consensus processing of private transaction data performed by the entities participating in the private transaction.

17. The system of claim 13, wherein the private consensus process is performed by entities participating in the private transaction.

18. The system of claim 13, wherein the DLS is a consortium DLS.

* * * * *